(12) United States Patent
Rozenberg et al.

(10) Patent No.: US 11,455,229 B2
(45) Date of Patent: Sep. 27, 2022

(54) DIFFERENCING OF EXECUTABLE DATAFLOW GRAPHS

(71) Applicant: Ab Initio Technology LLC, Lexington, MA (US)

(72) Inventors: Ilya Rozenberg, Auburndale, MA (US); Adam Weiss, Lexington, PA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 17/067,020

(22) Filed: Oct. 9, 2020

(65) Prior Publication Data

US 2021/0208999 A1 Jul. 8, 2021

Related U.S. Application Data

(63) Continuation of application No. 15/587,987, filed on May 5, 2017, now Pat. No. 10,802,945.

(Continued)

(51) Int. Cl.
*G06F 9/44* (2018.01)
*G06F 11/36* (2006.01)
(Continued)

(52) U.S. Cl.
CPC ............ *G06F 11/3612* (2013.01); *G06F 8/10* (2013.01); *G06F 8/34* (2013.01); *G06F 8/71* (2013.01);
(Continued)

(58) Field of Classification Search
CPC ....................................................... G06F 9/44
(Continued)

(56) References Cited

U.S. PATENT DOCUMENTS 5,966,072 A 10/1999 Stanfill et al.
5,974,254 A 10/1999 Hsu
(Continued)

FOREIGN PATENT DOCUMENTS

JP H10-177477 6/1998

OTHER PUBLICATIONS

Dullien ("Graph-based comparison of Executable Objects") (Year: 2005).*

(Continued)

*Primary Examiner* — Jae U Jeon
(74) *Attorney, Agent, or Firm* — Fish & Richardson P.C.

(57) ABSTRACT

A method for displaying differences between a first executable dataflow graph and a second executable dataflow graph includes comparing a specification of the first executable dataflow graph and a specification of the second executable dataflow graph, including at least one of identifying a particular node or link of the first dataflow graph that does not correspond to any node or link of the second dataflow graph; and identifying a first node or link of the first dataflow graph that corresponds to a second node or link of the second dataflow graph, and identifying a difference between the first node or link and the second node or link. The method includes formulating and displaying a graphical representation of at least some of the nodes or links of the first dataflow graph or the second dataflow graph, the graphical representation including a graphical indicator of at least one of the identified particular node or link the identified difference between the first node or link and the second node or link.

25 Claims, 13 Drawing Sheets

Related U.S. Application Data

(60) Provisional application No. 62/431,195, filed on Dec. 7, 2016.

(51) Int. Cl.
*G06F 8/34* (2018.01)
*G06F 8/10* (2018.01)
*G06F 9/448* (2018.01)
*G06F 8/71* (2018.01)

(52) U.S. Cl.
CPC ........ *G06F 9/4494* (2018.02); *G06F 11/3608* (2013.01)

(58) Field of Classification Search
USPC .................................................. 717/107–113
See application file for complete search history.

(56) References Cited

U.S. PATENT DOCUMENTS

| | | | |
|---|---|---|---|
| 7,139,837 B1* | 11/2006 | Parekh | H04L 45/48 709/238 |
| 10,152,406 B2* | 12/2018 | Yoshida | G06F 11/3604 |
| 2005/0257221 A1* | 11/2005 | Inchingolo | G06F 8/433 718/100 |
| 2006/0059144 A1* | 3/2006 | Canright | G06F 16/382 |
| 2006/0190105 A1* | 8/2006 | Hsu | G06F 8/34 700/86 |
| 2007/0011668 A1 | 1/2007 | Wholey et al. | |
| 2010/0205588 A1 | 8/2010 | Yu et al. | |
| 2011/0016354 A1* | 1/2011 | Douros | G06F 11/1471 718/101 |
| 2015/0286192 A1 | 10/2015 | Morrow | |
| 2018/0157579 A1 | 6/2018 | Rozenberg et al. | |

OTHER PUBLICATIONS

JP Office Action Japanese Appln. No. 2019-528545, dated Jan. 12, 2021, 8 pages (with English translation).
JP Office Action Japanese Appln. No. 2019-528545, dated May 14, 2021, 4 pages (with English translation).
AU Office Action in Australian Appln. No. 2017370567, dated Mar. 3, 2021, 4 pages.
Dullien ("Graph-based comparison of Executable Objects"), Jan. 2005, 13 pages.
International Preliminary Report on Patentability issued in PCT/US2017/064493, dated Jun. 20, 2019.
International Search Report and Written Opinion issued in PCT/US2017/064493, dated Apr. 16, 2018 (12 pages).
Office Action in Australian Appln. No. 2017370567, dated Feb. 28, 2022, 4 pages.
Office Action in European Appln. No. 17822835.9, dated Sep. 7, 2021, 6 pages.

* cited by examiner

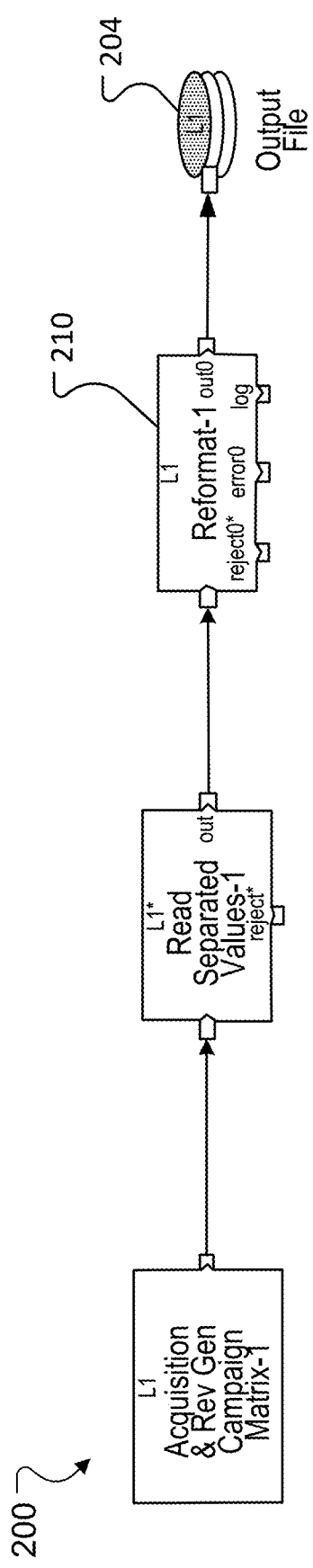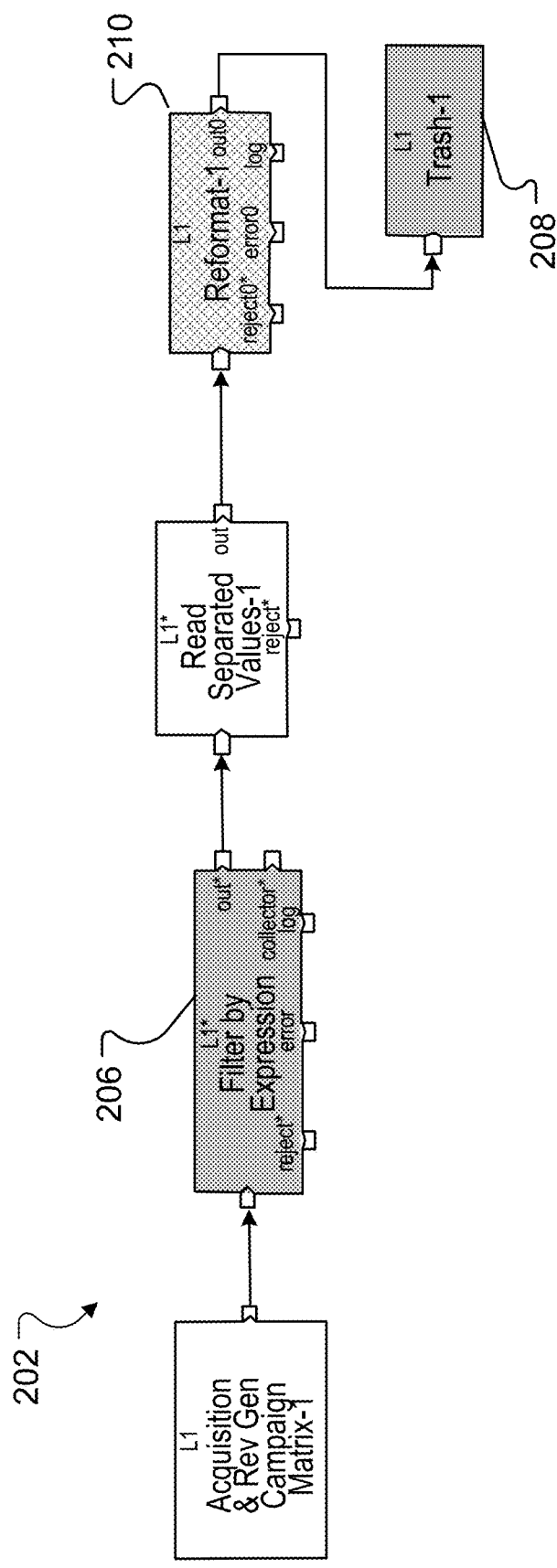
FIG. 2A
FIG. 2B

250

Component Differences-Reformat_1

| Difference Navigation Tree | | Name | Old Value | New Value |
|---|---|---|---|---|
| ⊟ Reformat_1 | | ⊞ Description | | |
| ⋮⊟ Changed parameters transform0 | | ⊟ Parameters | | |
| | | → ◇ count | 1 | 1 |
| | | → ◇ transform0 | out::xl_datestring_to_int[in] = begin  let interg | out::xl_datestring_to_int[in] = begin  let interg |
| | | → ◇ select | | |
| | | → ◇ reject-threshold | Abort on first reject | Abort on first reject |
| | | → ◇ output-index | | |
| | | → ◇ logging | False | False |
| | | → ◇ condition | | |
| | | → ◇ conditionInputPort | in | in |
| | | → ◇ conditionOutputPort | out* | out* |
| | | → ◇ condition-interpretation | Replace with flow | Replace with flow |
| | | → ◇ Layout | . | . |
| | | → ◇ in_metadata | [Same as:/u/vabaya/Temp/AcqRevGen_Ca | [Same as:/u/vabaya/Temp/AcqRevGen_Ca |
| | | → ◇ out0_metadata | /*DML Generated for SQL: SELECT *FROM | /*DML Generated for SQL: SELECT *FROM |
| | | → ◇ reject0_metadata | [Same as:/u/vabaya/Temp/AcqRevGen_Ca | [Same as:/u/vabaya/Temp/AcqRevGen_Ca |
| | | → ◇ error0_metadata | string("\n) | string("\n) |
| | | → ◇ log_metadata | record string ("T") node, timestamp, component | record string ("T") node, timestamp, component |
| | | ⊞ Layout | | |
| | | ⊞ Ports | | |

Difference   Edit Left   Edit Right

FIG. 4

| Parameters and Attributes | Ports | Textual Diff | | | |
|---|---|---|---|---|---|

Parameters and attributes for 'Generated Output DML'

| | Name | First Value | Second Value | Type | Req'd |
|---|---|---|---|---|---|
| ✶ | write metadata | record string("\n, *chart="-ab-internal"*)line; | record string("\n")line; end; | Record Format | ✓ |
| + | eme dataset location | *Ab Initio* | | String | |
| ✶ | = author | | Tim Perkins | | |

| | | Parameters and Attributes | Ports |
|---|---|---|---|
| | | Name | |
| | D | old | |
| X | D | input counts | |
| | D | new | |
| | Σ | add | |
| | Σ | delete | |
| X | Σ | diff | |
| | Σ | unchanged | |
| X | Σ | counts | |
| X | Σ | update | |
| + | Σ | difference | |

| | | Parameters and Attributes | Methods |
|---|---|---|---|
| | | Name | |
| | ⚡ | atrollback | |
| ✱ | ⚡ | atstart | |
| | ⚡ | perform | |

DIFFERENCING OF EXECUTABLE DATAFLOW GRAPHS

CLAIM OF PRIORITY

This application is a continuation of U.S. patent application Ser. No. 15/587,987, filed on May 5, 2017, which claims priority to U.S. patent application Ser. No. 62/431,195, filed on Dec. 7, 2016, the entire contents of which are incorporated here by reference.

BACKGROUND

During development or execution of a computer program, changes can be made to the computer program. Information about the changes can be useful to a developer, e.g., to help the developer understand the impact of a change, determine why an updated computer program no longer functions correctly, or keep track of edits from multiple people.

SUMMARY

In an aspect, a method is for displaying the differences between a first executable dataflow graph and a second executable dataflow graph, each dataflow graph executable to process data received by the dataflow graph, each dataflow graph including one or more nodes representing data processing components and one or more links representing flows of data between components. The method includes by a computer, comparing a specification of the first executable dataflow graph and a specification of the second executable dataflow graph to identify one or more differences between the first dataflow graph and the second dataflow graph. The specification of a given executable dataflow graph defines one or more nodes each representing a source of data to be processed by the dataflow graph, one or more nodes each representing a data processing component defining an operation to be performed to process the data from the source of data, and one or more nodes each representing a destination for data processed by the dataflow graph. The comparing of the first dataflow graph and the second dataflow graph includes at least one of (1) identifying a particular node or link of the first dataflow graph that does not correspond to any node or link of the second dataflow graph, and (2) identifying a first node or link of the first dataflow graph that corresponds to a second node or link of the second dataflow graph, and identifying a difference between the first node or link and the second node or link. The method includes formulating a graphical representation of at least some of the nodes or links of the first dataflow graph or the second dataflow graph, the graphical representation including a graphical indicator of at least one of (1) the identified particular node or link (1) the identified difference between the first node or link and the second node or link; and displaying the graphical representation in a graph editing interface.

Embodiments can include one or more of the following features.

The first dataflow graph is a first version of a particular dataflow graph and in which the second dataflow graph is a second version of the particular dataflow graph.

Identifying a difference between the first node or link and the second node or link includes identifying a difference between a resolved parameter of the first node or link and a resolved parameter of the second node or link.

Identifying a difference between the first node or link and the second node or link includes identifying a difference between an expression for a parameter of the first node or link and an expression for a parameter of the second node or link.

The graphical indicator is a color of the first, second, or particular node or link in the graphical representation.

The color of the graphical indicator is indicative of a type of the identified difference between the first node or link and the second node or link.

The graphical indicator is a shading or fill of the first, second, or particular node or link in the graphical representation.

The graphical indicator includes a symbol positioned near the first, second, or particular node or link.

The graphical indicator is responsive to user interaction. The method includes enabling access to information indicative of the identified difference responsive to user interaction with the graphical indicator.

The first dataflow graph contains a first dataflow subgraph and in which the second dataflow graph contains a second dataflow subgraph, and the method includes comparing a specification of the first dataflow subgraph and a specification of the second dataflow subgraph; and based on the comparing, identifying one or more differences between the first dataflow subgraph and the second dataflow subgraph.

The graphical representation includes a graphical representation of at least a portion of the first dataflow subgraph or at least a portion of the second dataflow subgraph, the graphical representation including a graphical indicator of at least one of the identified differences between the first dataflow subgraph and the second dataflow subgraph.

The graphical representation includes a hierarchical representation of at least one of the identified differences between the first dataflow graph and the second dataflow graph and at least one of the identified differences between the first dataflow subgraph and the second dataflow subgraph.

Comparing the specification of the first dataflow graph and the specification of the second dataflow graph includes comparing a first file referenced by the first dataflow graph and a second file referenced by the second dataflow graph. The graphical representation includes a graphical representation of one or more differences between the first file and the second file.

Identifying a first node or link that corresponds to a second node or link includes identifying the first node based on one or more of (1) a name of the first node or link and second node or link and (2) an identifier of the first node or link and second node or link.

Identifying a first node or link that corresponds to a second node or link includes identifying the first node based on information associated with data flow into or out of the first node and second node.

Identifying a first node or link that corresponds to a second node or link includes identifying the first node or link based on nodes or links that are upstream or downstream of the first node or link and second node or link.

The method includes preparing the first dataflow graph and the second dataflow graph for execution; and comparing the specifications of the prepared first and second dataflow graph.

In an aspect, a non-transitory computer readable medium stores instructions for causing a computer to display the differences between a first executable dataflow graph and a second executable dataflow graph, each dataflow graph executable to process data received by the dataflow graph, each dataflow graph including one or more nodes representing data processing components and one or more links representing flows of data between components. The instructions cause the computer to compare a specification of the first executable dataflow graph and a specification of the second executable dataflow graph to identify one or more differences between the first dataflow graph and the second dataflow graph. The specification of a given executable dataflow graph defines one or more nodes each representing a source of data to be processed by the dataflow graph, one or more nodes each representing a data processing component defining an operation to be performed to process the data from the source of data, and one or more nodes each representing a destination for data processed by the dataflow graph. The comparing of the first dataflow graph and the second dataflow graph includes at least one of (1) identifying a particular node or link of the first dataflow graph that does not correspond to any node or link of the second dataflow graph, and (2) identifying a first node or link of the first dataflow graph that corresponds to a second node or link of the second dataflow graph, and identifying a difference between the first node or link and the second node or link. The instructions cause the computer to formulate a graphical representation of at least some of the nodes or links of the first dataflow graph or the second dataflow graph, the graphical representation including a graphical indicator of at least one of (1) the identified particular node or link (1) the identified difference between the first node or link and the second node or link; and display the graphical representation in a graph editing interface.

In an aspect, a system is for displaying the differences between a first executable dataflow graph and a second executable dataflow graph, each dataflow graph executable to process data received by the dataflow graph, each dataflow graph including one or more nodes representing data processing components and one or more links representing flows of data between components. The system includes a processor and memory configured to compare a specification of the first executable dataflow graph and a specification of the second executable dataflow graph to identify one or more differences between the first dataflow graph and the second dataflow graph. The specification of a given executable dataflow graph defines one or more nodes each representing a source of data to be processed by the dataflow graph, one or more nodes each representing a data processing component defining an operation to be performed to process the data from the source of data, and one or more nodes each representing a destination for data processed by the dataflow graph. The comparing of the first dataflow graph and the second dataflow graph includes at least one of (1) identifying a particular node or link of the first dataflow graph that does not correspond to any node or link of the second dataflow graph, and (2) identifying a first node or link of the first dataflow graph that corresponds to a second node or link of the second dataflow graph, and identifying a difference between the first node or link and the second node or link. The processor and memory are configured to formulate a graphical representation of at least some of the nodes or links of the first dataflow graph or the second dataflow graph, the graphical representation including a graphical indicator of at least one of (1) the identified particular node or link (1) the identified difference between the first node or link and the second node or link; and display the graphical representation in a graph editing interface.

In an aspect, a system is for displaying the differences between a first executable dataflow graph and a second executable dataflow graph, each dataflow graph executable to process data received by the dataflow graph, each dataflow graph including one or more nodes representing data processing components and one or more links representing flows of data between components. The system includes means for comparing a specification of the first executable dataflow graph and a specification of the second executable dataflow graph to identify one or more differences between the first dataflow graph and the second dataflow graph. The specification of a given executable dataflow graph defines one or more nodes each representing a source of data to be processed by the dataflow graph, one or more nodes each representing a data processing component defining an operation to be performed to process the data from the source of data, and one or more nodes each representing a destination for data processed by the dataflow graph. The comparing of the first dataflow graph and the second dataflow graph includes at least one of (1) identifying a particular node or link of the first dataflow graph that does not correspond to any node or link of the second dataflow graph, and (2) identifying a first node or link of the first dataflow graph that corresponds to a second node or link of the second dataflow graph, and identifying a difference between the first node or link and the second node or link. The system includes means for formulating a graphical representation of at least some of the nodes or links of the first dataflow graph or the second dataflow graph, the graphical representation including a graphical indicator of at least one of (1) the identified particular node or link (1) the identified difference between the first node or link and the second node or link; and means for displaying the graphical representation in a graph editing interface.

In an aspect, a method is for displaying the differences between a first version of an executable dataflow graph and a second version of the executable dataflow graph, the dataflow graph executable to process data received by the dataflow graph, each version of the dataflow graph including one or more nodes representing data processing components and one or more links representing flows of data between components. The method includes, with an integrated control system, monitoring a status of a job that includes one or more operations that can be executed to process data, the job associated with the first version of the executable dataflow graph. The method includes enabling output of information indicative of the status of the job; responsive to user interaction with the integrated control system or the outputted information, identifying the second version of the executable dataflow graph; comparing a specification of the first version of the dataflow graph and a specification of the second version of the dataflow graph to identify one or more differences between the first version of the dataflow graph and the second version of the dataflow graph. The specification of a given executable dataflow graph defines one or more nodes each representing a source of data to be processed by the dataflow graph, one or more nodes each representing a data processing component defining an operation to be performed to process the data from the source of data, and one or more nodes each representing a destination for data processed by the dataflow graph. The comparing of the first version of the dataflow graph and the second version of the dataflow graph includes at least one of (1) identifying a first node or link of the first version of the dataflow graph that does not correspond to any node or link of the second version of the dataflow graph, (2) identifying a second node or link of the second version of the dataflow graph that does not correspond to any node or link of the first version of the dataflow graph, and (1) identifying a third node or link of the first version of the dataflow graph that corresponds to a fourth node or link of the second version of the dataflow graph, and identifying a difference between the third node or link and the fourth node or link. The method includes formulating a graphical representation of at least some of the nodes or links of the first version of the dataflow graph or the second version of the dataflow graph, the graphical representation including a graphical indicator of at least one of (1) the identified first node or link, (2) the identified second node or link, and (3) the identified difference between the third node or link and the fourth node or link.

Embodiments can include one or more of the following features.

A previously executed job is associated with the second version of the dataflow graph.

The graphical representation includes a hierarchical representation of one or more of the identified differences.

The method includes formulating the graphical representation for display in a user interface of the integrated control system.

Identifying a difference between the first version of the dataflow graph and the second version of the dataflow graph includes identifying a difference between a resolved parameter of the first version of the dataflow graph and a resolved parameter of the second version of the dataflow graph.

Identifying a difference between the first version of the dataflow graph and the second version of the dataflow graph includes identifying a difference between an expression for a parameter of the first version of the dataflow graph and an expression for a parameter of the second version of the dataflow graph.

Identifying a difference between the first version of the dataflow graph and the second version of the dataflow graph includes identifying a difference between a first file referenced by the first version of the dataflow graph and a second file referenced by the second version of the dataflow graph.

Monitoring the status of the job includes monitoring one or more of an activity of the job, an actual start time of the job, an estimated start time of the job, a processing duration associated with the job, and a size of the job.

Monitoring the status of the job includes determining whether the job was successfully completed.

The method includes monitoring the status of an application, in which the job is associated with the application.

The method includes monitoring the status of a computing device, in which the application is hosted by the computing device.

The approaches described here enable presentation of a graphical representation of differences between executable applications, such as computer programs (e.g., dataflow graphs), thus providing a high-level visual overview of the differences between the applications. For instance, a graphical representation of differences between a first dataflow graph (e.g., an early version of the dataflow graph) and a second dataflow graph (e.g., a later, edited version of the dataflow graph) can depict a high-level view of components that were added, removed, or modified during the editing process. The graphical representation of differences between executable applications can be interactive. For instance, a user can drill down into a component in the graphical representation to view detailed information about that component, such as information about modifications made to the component.

The presented information about differences between dataflow graphs can provide valuable technical support to a developer during graph creation or editing. For instance, a developer may use the visualization to reconcile development that has happened on different branches in a source code control system. A developer may use the visualization to refresh her memory about recent changes she has made relative to a version under source code control. A developer may use the visualization to evaluate someone else's recent changes to a graph, e.g., to confirm that another developer made the changes that were expected and no other changes or to ensure that certain quality standards have been met. A developer or quality control team may want to understand why the behavior of a graph changed between successive versions, e.g., why a newer version of a graph crashes, runs more slowly, gives wrong answers, consumes more CPU time, or otherwise behaves differently. A developer may want to edit a graph through a difference visualization, e.g., to merge multiple versions into a single version or to undo a change to the graph.

Visualization of differences between graphs can be technically valuable after a graph is in production. For instance, a new feature created in by a development team can be unified with a minor bug fix from a production branch. A quality control team may become aware that a particular buggy line of code was introduced somewhere in a series of changes made to a graph, and the visualization can be used to discover which version is the first version with that code so that affected customers can be notified.

BRIEF DESCRIPTION OF DRAWINGS

FIGS. 2A and 2B are diagrams of graphical representations of differences between graphs.
FIGS. 4-7 are diagrams of node-level views.
FIG. 13 is a diagram of a control center interface.

DETAILED DESCRIPTION

We describe here an approach to graphically representing differences between executable applications, such as computer programs (e.g., dataflow graphs), thus providing a high-level visual overview of the differences between the applications. For instance, a graphical representation of differences between a first dataflow graph (e.g., an early version of the dataflow graph) and a second dataflow graph (e.g., a later, edited version of the dataflow graph) can depict components that were added, removed, or modified during the editing process. The graphical representation of differences between executable applications can be interactive. For instance, a user can drill down into a component in the graphical representation to view detailed information about that component, such as information about modifications made to the component. In some cases, one or more of the differences between executable applications can be manually or automatically migrated from one executable application to the other through user interaction with the graphical representation of the differences between the executable applications.

Figure 1:
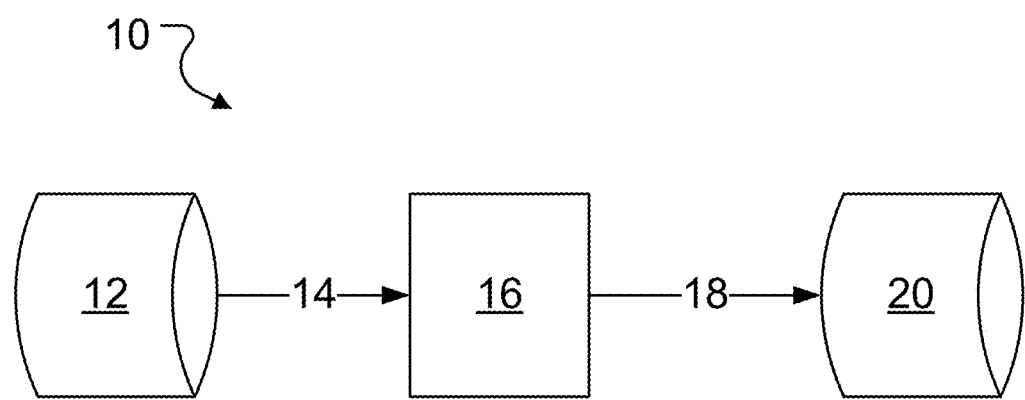
FIG. 1 is a diagram of a graph.

A dataflow graph (which we sometimes also refer to as a graph) is a visual representation of a computer program that can include nodes representative of data processing components and datasets, such as data sources and data sinks. Datasets can be, for example, files, database tables, or other types of data sources or sinks that can provide data (e.g., data records) for processing by the graph or receive data processed by the graph. Data processing components and datasets are sometimes collectively referred to as nodes of the graph. A link connecting two nodes of a graph represents a flow of data between the first node and the second node. FIG. 1 shows a simple dataflow graph 10 that includes a data source 12 connected by a flow 14 to a filter component 16. The filter component 16 is connected by a flow 18 to a data sink 20.

The nodes of a graph can have input ports and/or output ports to which flows can be connected. In the example of FIG. 1, the upstream ends of the flows 14, 18 are connected to an output port of the data source 12 and to an output port of the filter component 14, respectively. The downstream ends of the flows 14, 18 are connected to an input port of the filter component 14 and to an input port of the data sink 20, respectively.

Data processing components execute operations to process data. A data processing component is a graphical representation of an object defined by code that, when executed, implements the operation of the data processing component. The operation of a data processing component can be defined with respect to one or more parameters. The parameters can be defined in a file (e.g., a .dml file) that is referenced by the code of the data processing component. For instance, the file can include values or expressions for parameters associated with the data processing component. When the graph is instantiated (e.g., at runtime), expressions for the parameters are evaluated to obtain values for the parameters, sometimes referred to as resolving the parameters. Parameter values or expressions can be defined, for example, by a user over a user interface (e.g., in response to a prompt), defined from a file, or defined in terms of another parameter in the same context or in a different context. For example, a parameter can be exported from a different context (e.g., a parameter evaluated in the context of a different component) by designating the parameter to have a "same as" relationship to another parameter.

In some examples, a component in a graph can be implemented using a set of other components that are themselves interconnected with flows. This set of components through which a component in a graph is implemented is referred to as a subgraph, and is a node of the graph.

An analysis to identify differences (sometimes referred to as a differencing analysis) between a first graph and a second graph (e.g., a first version of a graph and a second, edited version of the graph) can identify nodes that are present in the first graph but not in the second graph (referred to as deleted nodes or removed nodes), nodes that are present in the second graph but not in the first graph (referred to as added nodes), or nodes that have been modified. A modified node can be generally similar between the first graph and the second graph, but with changes to parameters, attributes, or other features associated with the node, as discussed further below. A differencing analysis can also identify differences between flows of the first graph and flows of the second graph.

A plan is a visual representation of a process that involves the execution of multiple graphs. In a plan, the individual graphs are the nodes and are interconnected by flows indicative of the flow of data among the graphs of the plan. The approaches described here can be used to graphically represent differences between plans. For instance, a differencing analysis performed on a first plan and a second plan can identify nodes (e.g., graphs) that are present in the first plan but not in the second plan, nodes that are present in the second plan but not in the first plan, or nodes that have been modified.

In some examples, a nested differencing analysis can be performed that identifies differences between plans, differences between corresponding graphs in the plans, differences between corresponding subgraphs in the graphs, and/or differences between corresponding parameter files referenced by nodes in the graphs. A graphical representation of the results of the nested differencing analysis can indicate the hierarchical nature of the plans, graphs, and subgraphs and the associated differences.

Although we generally refer to the analysis and graphical representation of the differences between graphs in the following discussion, the approaches can also generally apply to the analysis and graphical representation of plans, subgraphs, parameter files, and/or other files referenced by graphs.

Visualization of differences between graphs can be valuable to a developer during graph creation or editing. For instance, a developer may use the visualization to reconcile development that has happened on different branches in a source code control system. A developer may use the visualization to refresh her memory about recent changes she has made relative to a version under source code control. A developer may use the visualization to evaluate someone else's recent changes to a graph, e.g., to confirm that they made the changes that were expected and no other changes or to ensure that certain quality standards have been met. A developer or quality control team may want to understand why the behavior of a graph changed between successive versions, e.g., why a newer version crashes, or runs more slowly, or gives wrong answers, or consumes more CPU time. A developer may want to edit a graph through a difference visualization, e.g., to merge multiple versions into a single version or to undo a change to the graph.

Visualization of differences between graphs can be valuable to a person in a supervisory role, such as a project manager, who wants to view updates to a graph but does not necessarily intend to edit the graph himself.

Visualization of differences between graphs can be valuable after a graph is in production. For instance, a new feature created in by a development team can be unified with a minor bug fix from a production branch. A quality control team may become aware that a particular buggy line of code was introduced somewhere in a series of changes made to a graph, and the visualization can be used to discover which version is the first version with that code so that affected customers can be notified.

Referring to FIGS. 2A and 2B, in an example, graphical representations of two versions of a graph are shown on a canvas: a representation of a first version 200 (sometimes referred to simply as the first version 200) and a representation of a second version 202 (sometimes referred to simply as the second version 202). For instance, the graph can be in its development process and the first version 200 can be an earlier version of the graph and the second version 202 can be a more recent version of the graph. Differences between the first and second versions 200, 202 of the graph are displayed graphically, e.g., by indicators that denote differences between the first and second versions 200, 202 of the graph. The indicators can be, for instance, colors, shading, fill, icons, symbols, textual annotations, or other types of indicators. In an example, deleted nodes (nodes that are present in the first version 200 of the graph but not in the second version 202 of the graph) are shown in red. Added nodes (nodes that are present in the second version of the graph 202 but not in the first version of the graph 200) are shown in green. Modified nodes (nodes that are present in both versions 200, 202 of the graph but that are not identical) are shown in blue.

In the example of FIGS. 2A and 2B, an output file 204 is a deleted node that is present in the first version 200 of the graph but not in the second version 202. The output file 204 is shown on the canvas in red. A filter component 206 and a trash component 208 are added nodes that are present in the second version 202 of the graph but not in the first version 200. The filter component 206 and the trash component 208 are shown on the canvas 20 in green. A reformat component 210 is present in both versions 200, 202 of the graph but with modifications. For instance, an expression or value for a parameter or attribute of the reformat component 210 may be different between the two versions 200, 202 of the graph. The reformat component 210 is shown on the canvas in blue.

In some examples, the nodes of the first and/or second versions 200, 202 of the graph can be responsive to user interaction, such as a click, tap, hover, or other interaction. For instance, a user can hover a pointer over the reformat component 210 to view additional information about the modifications, such as a list of parameters or attributes of the reformat component 210 that are different between the first and second versions 200, 202 of the graph. In some examples, the additional information can be displayed on the canvas, e.g., near the node or in a blank space of the canvas. In some examples, a new window or information bubble is opened, e.g., in front of the canvas, to display the information.

Figure 3:
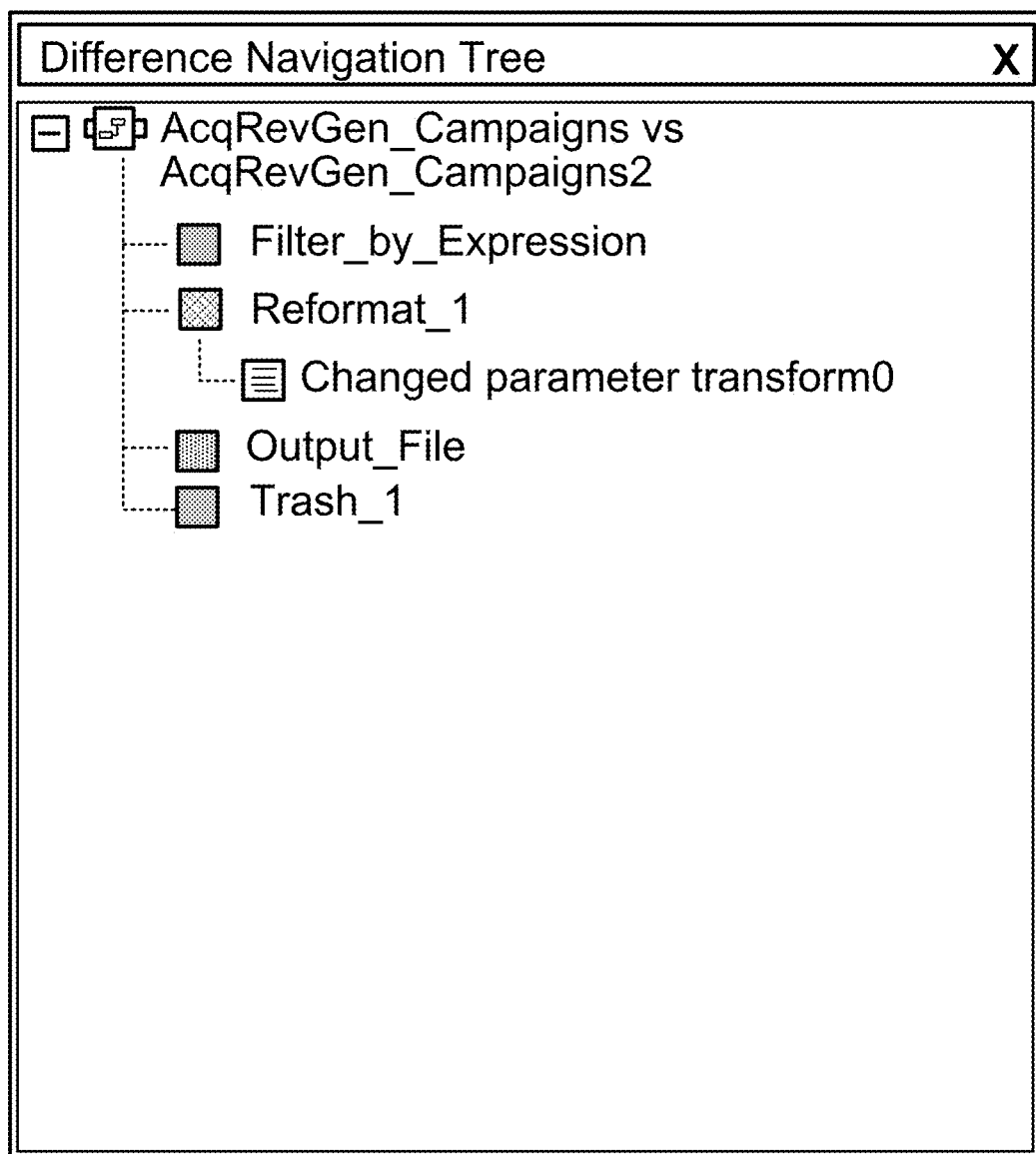
FIG. 3 is a diagram of a navigation tree.

Referring to FIG. 3, in some examples, a graphical representation of differences between the first and second versions 200, 202 of a graph can take the form of a hierarchical list in a navigation tree 220. The navigation tree 220 can list the nodes in a tree structure similar in logical structure to the graphs 200, 202. In some examples, the navigation tree 220 can list all of the nodes of the graphs 200, 202. In some examples, the navigation tree 220 can list only those nodes that differ between the versions 200, 202 of the graph, such as only added nodes, deleted nodes, and modified nodes.

A navigation tree can be used to depict a hierarchical list of differences between plans. A navigation tree for plans can include a list of nodes (e.g., graphs) in addition to other aspects of the plans, such as a list of tasks, a list of methods, or other aspects.

Each of the added, deleted, and modified nodes is represented by an entry in the hierarchical list of the navigation tree 220. An icon associated with each node on the list indicates whether the node is an added node, a deleted node, or a modified node, for instance, by the color, shading, fill, shape, or another characteristic of the icon. In the example of FIG. 3, the icon for a deleted node is a green square, the icon for an added node is a green square, and the icon for a modified node is a blue square.

One or more of the entries in the navigation tree 220 can include a sub-entry, for instance, to provide additional information about the node. For instance, if the node is a modified node, each feature of the node that is different between the first and second versions 200, 202 of the graph can be listed in a corresponding sub-entry under the entry for the modified node. For instance, for the reformat component 210 (a modified component), a sub-entry can be included in the navigation tree 220 for each feature (e.g., parameter or attribute or other feature) that is different between the first and second versions 200, 202. The sub-entry can include information about the feature, e.g., the type of the feature (e.g., parameter, attribute, or another type of feature), the name of the feature, the value of the feature in the first version 200 of the graph, the value of the feature in the second version 202 of the graph, or other information.

Referring to FIG. 4, in some examples, differences between a modified node (e.g., the reformat component 210) in first and second versions 200, 202 of a graph can be displayed in a table format in a node-level view 250. The node-level view 250 includes one or more tables that list features of the node, such as the node's description, parameters, attributes, layout, ports, or other features.

In the example of FIG. 4, a parameters and attributes table lists the parameters and attributes of a node. The parameters and attributes table can include only those parameters and attributes having values or expressions that differ between the first version and the second version of the graph or can include all parameters and attributes of the node. Each row represents a parameter or attribute and includes the value or expression for the parameter or attribute in the first version 200 of the graph (referred to as the "old value") and/or the value of the parameter or attribute in the second version 202 of the graph (referred to as the "new value"). Values that differ between the first and second versions 200, 202 of the graph can be marked with an indicator, such as highlighting, an icon, or another type of indicator. For instance, in the example of FIG. 4, the old and new values for the transform component are highlighted, indicating that these values differ between the first and second versions 200, 202 of the graph.

The name column of the table in the node-level view 250 displays the name of the parameter or attribute. In some examples, the name column can include an indicator (e.g., an icon, a letter, or another indicator) of whether a name is the name of a parameter or an attribute. For instance, a parameter name can be marked with a diamond and an attribute name can be marked with an equal sign. In some examples, the name column can include an indicator of whether the parameter is an input parameter or a local parameter.

Referring to FIG. 5, in some examples, a parameters and attributes table 260 of a node-level view can include additional columns, such as a type column, a required column, an export column, or another column. A type column can display the dml type of the parameter, if applicable. The type column does not apply to component attributes. For plans, the type column can display the task type, such as graph, string, choice, or another task type. A required column can include an indicator that indicates whether the parameter is required and whether the required status of the parameter has changed between versions. An export column can include an indicator of whether the parameter is exported and whether the export status of the parameter has changed between versions.

Referring to FIG. 6, the node-level view can include a ports table 270 that includes a list of the ports of a node. The list of ports can include only those ports that have changed between the first and second versions of the graph, or can include all ports. Each row represents a port and includes the name of the port and the type of difference (e.g., addition, deletion, or modification). The type of difference can be depicted by an indicator. In some examples, a user can interact with the name of a port (e.g., by clicking or tapping on the name) to access a list or table of the parameters of the port.

Referring to FIG. 7, when characterizing differences between plans, the node-level view can include a methods table 280 that includes a list of the methods of the plan. The list of methods can include only those methods that have changed between the first and second versions of the plan, or can include all methods. Each row represents a method and includes the name of the method and the type of difference (e.g., deletion, addition, or modification). The type of difference can be depicted by an indicator. In some examples, a user can interact with the name of a method (e.g., by clicking or tapping on the name) to access a list or table of the parameters of the method.

In some examples, a text differencing view (not shown) can display the code for a node, e.g., a modified node, with an indication of the differences between the code for the node in each of the first and second versions of the graph. The differences can be indicated, e.g., with formatting (e.g., underlining, strikethrough, bold, italics, or other formatting), highlighting, or other approaches. In some examples, the code for a node in only one of the versions of the graph is presented, with an indication of the differences between the presented code and the code for the node in the other version of the graph. In some examples, the code for the node in both of the versions of the graph is presented, and each version of the code can have an indication of the differences relative to the other version of the code.

Each of these various views of the differences between first and second versions 200, 202 of a graph can offer advantages to a user. The graphical display on the canvas 20 of the differences between the first version 200 and the second version 202 of a graph enables a user to quickly grasp the differences at a high level, and without a large amount of detail. For instance, the display of the first and second versions 200, 202 on the canvas enables the user to quickly visualize which nodes have been added or deleted, and which nodes have been modified. The hierarchical list of the navigation tree 220 enables the user to focus on individual nodes outside of the context of the rest of the graph. The node-level view 250 provides the user with access to specific information about changes to a node, e.g., so that the user can drill down into a detailed understanding of the features of the node in each version 200, 202 of the graph.

Figure 8A:
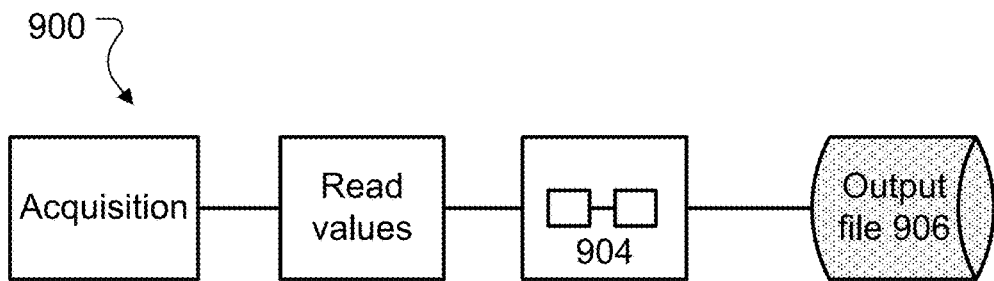
FIGS. 8A and 8B are diagrams of graphical representations of differences between graphs.
Figure 8B:
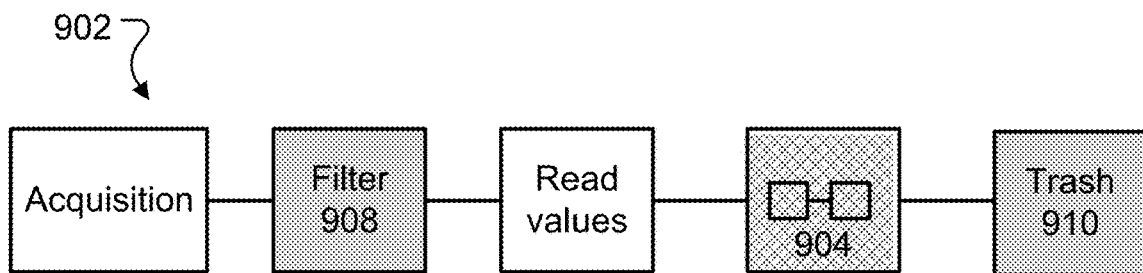

In some examples, graphs can include subgraphs, and the graphical representation of the differences between two graphs can provide information about differences between subgraphs referenced by the graphs. Referring to FIGS. 8A and 8B, representations of a first version 900 and a second version 902 of a graph including a subgraph 904 are shown on a canvas. Differences between the first and second versions 900, 902 are shown by indicators. If a difference is present in the subgraph, an indicator on the subgraph can provide a high-level indication of the difference. In some examples, additional information, such as a list or description of the differences in the subgraph 904, can be provided responsive to user interaction with the subgraph 904. In some examples, the components that form the subgraph 904 can be displayed, with indicators of differences as appropriate, responsive to user interaction with the subgraph 904.

In the example of FIGS. 8A and 8B, an output file 906 has been deleted and a filter component 908 and a trash component 910 have been added. In addition, a node in the subgraph 904 has been modified, which is depicted by an indicator on the subgraph 904.

Figure 9:
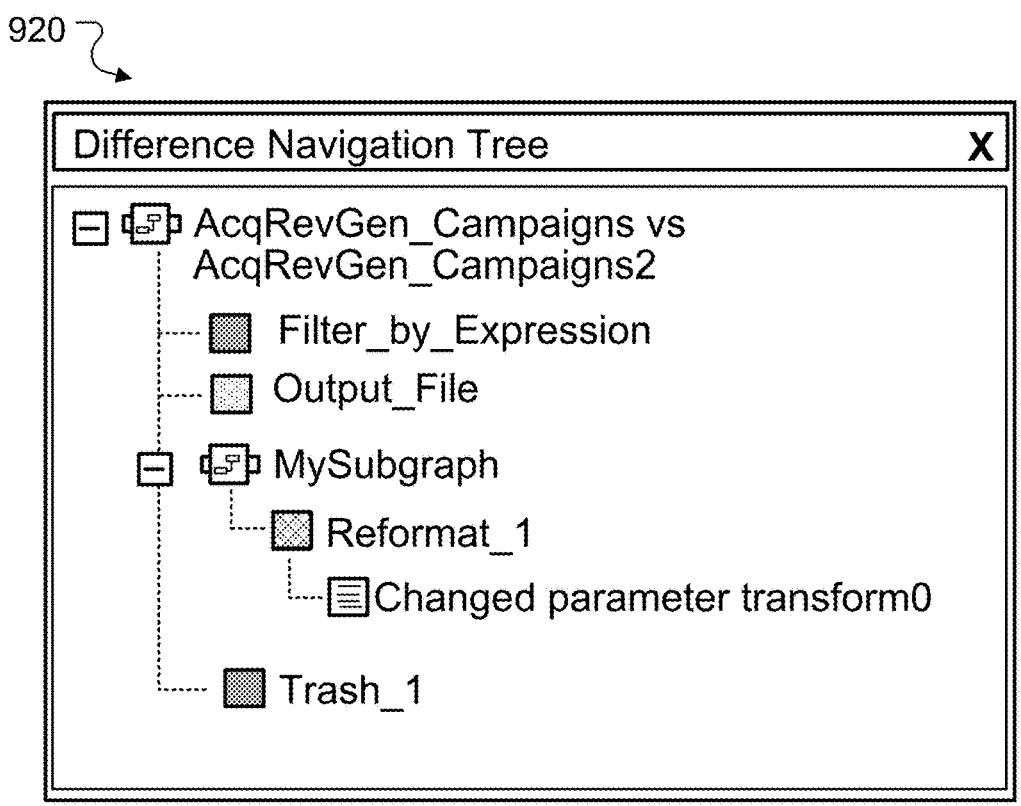
FIG. 9 is a diagram of a navigation tree.

Referring to FIG. 9, a navigation tree 920 can list the added nodes, deleted nodes, and modified nodes of the first and second versions 900, 902 of the graph. If a node of the subgraph 904 has been added, deleted, or modified, the subgraph 904 is included in the list and the node (e.g., a reformat component) is listed in a sub-entry under the entry for the subgraph 904. If the listed node of the subgraph 904 is a modified node, the sub-entry for that node (e.g., for the reformat component) can itself have a sub-entry for each feature (e.g., parameter or attribute or other feature) that is different between the first and second versions 900, 902 of the graph.

Figure 10:
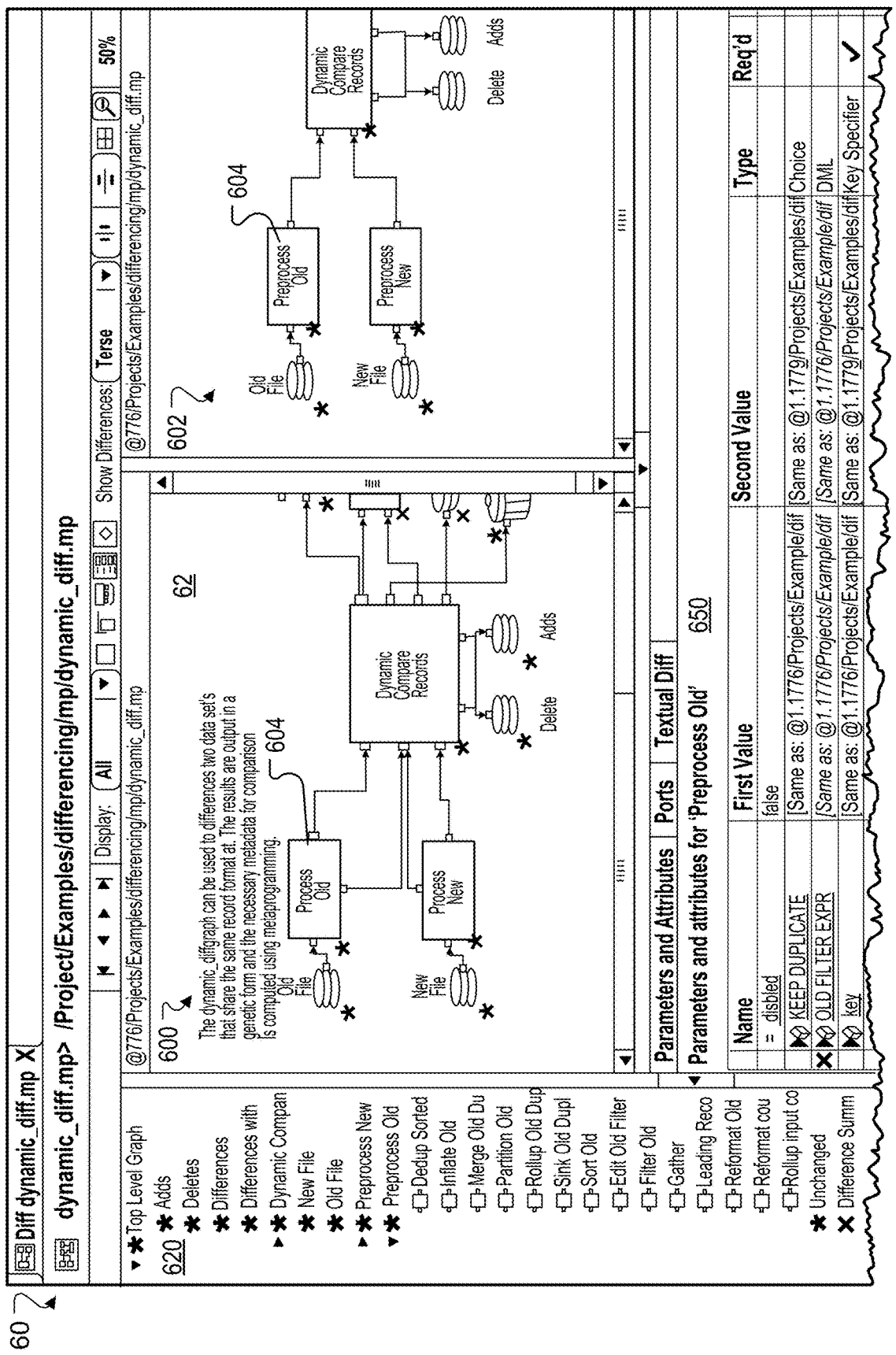
FIG. 10 is a diagram of a difference viewer interface.

Referring to FIG. 10, in some examples, multiple views can be integrated into a difference viewer interface 60 (sometimes also referred to as a difference viewer). The example difference viewer 60 of FIG. 10 includes a canvas 62 showing a graphical representation of a first version 600 of a graph and a second version 602 of the graph. In the difference viewer 60 of FIG. 10, the canvas 62 shows the first and second versions 600, 602 of the graph in a side-by-side orientation; in some examples, the canvas can show the first and second versions 600, 602 in a top and bottom orientation. The canvas 62 can be scalable and slidable to allow a user to focus into a region of interest in the first or second version 600, 602 of the graph. The difference viewer 60 also includes a navigation tree 620 and a node-level view 650. In the difference viewer 60, the various levels of information offered by the various views are all accessible to a user in a single, compact user interface.

In the example of FIG. 10, the indicators are icons positioned near the nodes, and the shape and color of the icon together indicates the type of difference. For instance, a red "X" indicates a deleted node, a green plus sign indicates an added node, and a yellow asterisk indicates a modified node. Entries in the navigation tree 620 can be grouped by the type of change, such as an addition, a deletion, or a modification.

The difference viewer 60 can be interactive. For instance, a user can select a difference to obtain information about that difference. The information about the difference can be displayed only in the view in which the user selected the difference or in one or more additional views, e.g., in all of the views. For instance, when a user interacts with a node on the canvas (e.g., by clicking on a "Preprocess Old" component 604), sub-entries for that node can be displayed on the navigation tree and a table of the features of that node can be displayed in the node-level view. The canvas, the navigation tree, and the node-level view can all be concurrently visible in the difference viewer 600, enabling a user to gain a thorough understanding of both the high-level differences and details about the differences for the selected node.

In some examples, the type of interaction the user has with a node controls the information that is displayed about that node. For instance, a single click on a node can cause the features (e.g., parameters or attributes) of that node to be displayed in the node-level view 650. A double click on a subgraph can expand the subgraph in the canvas and can cause the attributes and parameters of the subgraph to be displayed in the node-level view 650 and the entry for the subgraph in the navigation tree 620 to be expanded. Other examples of information displayed responsive to different types of user interaction can also be provided.

In some examples, the user can step through each difference consecutively to see information about every difference between the first and second versions 600, 602. In some examples, the user can choose to have displayed only those differences that can affect execution of the graph, such as changes to parameter values or the addition or deletion of a node. In some examples, the user can choose to have all differences displayed, including both differences that can affect execution of the graph and differences that do not affect graph execution (e.g., differences to comments and legends, changes to attribute values for attributes such as author and version attributes, changes to x and y coordinates of the placement of nodes, font changes, or other differences).

Figure 11:
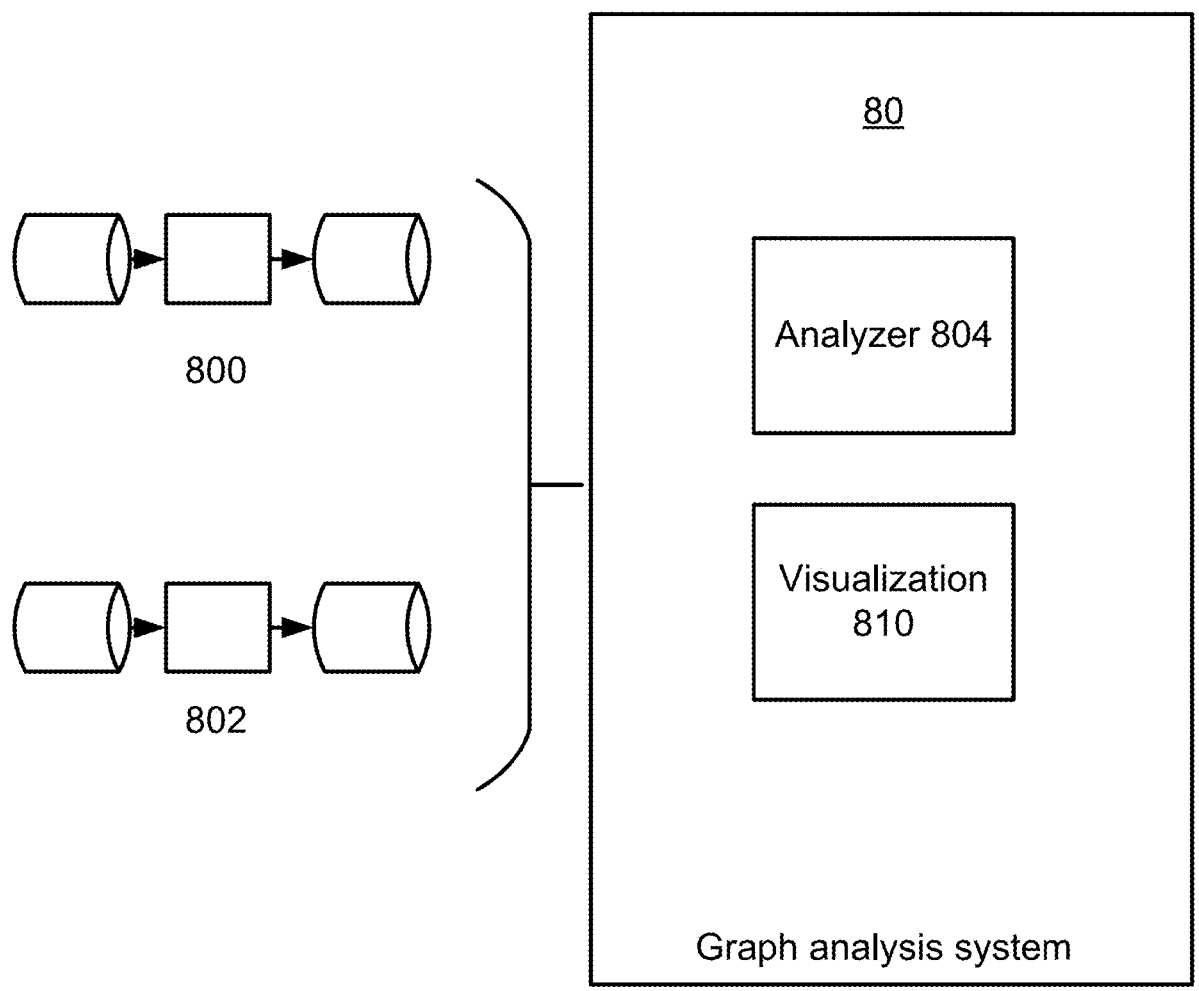
FIG. 11 is a diagram of a graph analysis system.

Referring to FIG. 11, a graph analysis system 80 that analyzes the differences between a first graph 800 and a second graph 802 includes a graph analyzer engine 804 that analyzes a specification of each graph 800, 802. The graph analyzer engine 804 determines which nodes (e.g., components or datasets) in the first graph 800 correspond to nodes in the second graph 802. Corresponding nodes are not necessarily identical and can be modified between the graphs, but are generally similar enough to be regarded as the same node in both graphs.

In some examples, the graph analyzer engine 804 identifies corresponding nodes based on metadata associated with the nodes, such as one or more of the type of the node (e.g., a data processing component versus a dataset, or a specific type of data processing component or dataset), a name of the node, a unique identifier of the node, or other metadata associated with the node. In some examples, the graph analyzer engine 804 identifies corresponding nodes based on information associated with data flow into or out of the nodes, such as the names or number of ports, the names or sources of data flows into the nodes, the names or destinations of data flows out of the nodes, or other information associated with data flow into or out of the nodes. In some examples, the graph analyzer engine 804 identifies corresponding nodes based on topological information, such as where a particular node is positioned in the graph relative to other nodes (e.g., which nodes are upstream or downstream of the particular node). In some examples, the graph analyzer 804 identifies corresponding nodes based on the location (e.g., x-y coordinates) of the nodes in a graphical representation of the graphs on a canvas. However, in some examples, the graph analyzer 804 does not use any location information in identifying corresponding nodes, e.g., because the location of a node on a canvas has no effect on the functionality of the node or the graph containing the node.

Any node in the first graph 800 for which there is no corresponding node in the second graph 802 is identified by the graph analyzer engine 804 as a deleted node. Any node in the second graph 802 for which there is no corresponding node in the first graph 800 is identified by the graph analyzer engine 804 as an added node. Nodes that correspond between the first and second graphs 800, 802 are analyzed by the graph analyzer engine 804 to determine whether the nodes have been modified. A visualization engine 810 generates data to enable rendering of a graphical representation of the differences between the first and second graphs 800, 802.

In some examples, the graph analyzer engine 804 can analyze both features that can affect the execution of a graph and features that do not affect the execution of a graph. Features that affect the execution of a graph can include, for instance, parameters, such as parameter expressions or parameter values. Features that do not affect the execution of a graph can include, for instance, attribute values (e.g., author attributes, name attributes, version attributes, or other attributes), comments, legends, formats (e.g., fonts), the location of a component on a canvas, or other features. In some examples, the graph analyzer engine 804 can analyze only features that can affect the execution of a graph and can disregard features that do not affect the execution of the graph.

An analysis of parameters associated with each of two corresponding nodes can identify whether any parameters were added (for instance, a parameter that is present in a node of the second graph but not present in the corresponding node of the first graph) or removed (for instance, a parameter that is present in a node of the first graph but not present in the corresponding node of the second graph). An analysis of parameters can include an analysis of expressions defining the parameters, values of the parameters, or both.

In some examples, an analysis of parameters associated with each of two corresponding nodes can determine whether the expressions for corresponding parameters were modified. To analyze the expressions for parameters, the parameter analysis can be performed on the source code corresponding to each node. In some examples, the parameter analysis can be performed after the graphs 800, 802 are instantiated and all parameters are resolved, e.g., after each graph calls any parameter files references by the specifications of the nodes. When parameter analysis is performed after graph instantiation, the graph analyzer engine 804 compares parameter values.

In some examples, the order of the parameters associated with each of two corresponding nodes can be analyzed by the graph analyzer engine 804; in some examples, the order of the parameters is disregarded by the graph analyzer engine. In some examples, expressions or values for parameters that are used only for dependency analysis can be analyzed by the graph analyzer engine 804; in some examples, expressions or values for these parameters is disregarded by the graph analyzer engine.

In some examples, the graph analyzer engine 804 can analyze external files referenced by graphs or plans to identify any differences between the files referenced by the graphs 800, 802. In some examples, only certain types of files are analyzed by the graph analyzer engine 804, such as record format files (e.g., .dml files), transform files (e.g., .xfr files), or other types of files the contents of which can affect execution of the graphs. Other files, such as files providing data for processing by the graphs or plans, are not considered.

In some examples, the graphs or plans to be analyzed can be upgraded to a common file format prior to the analysis. For instance, the graphs or plans can be upgraded to a current file format or to the file format of the most recent of the graphs or plans. In some examples, graphs or plans can be analyzed in their own original file formats. Retaining the original file format for the comparison can be useful, e.g., to identify differences that are caused by or otherwise related to file format changes.

In some examples, the scope of the analysis to be performed by the graph analyzer engine 804 can be set by default, e.g., the graph analyzer engine 804 can be set by default to consider only differences that affect graph execution. In some examples, a user can specify the scope of the analysis to be performed by the graph execution engine.

In some examples, graphical representation of the differences between graphs can be integrated into a software development platform. A software development platform can be used, e.g., by a software developer who develops or maintains software, such as graphs. A developer can make use of graphical representation of differences between a previous version of a graph and an updated version of a graph to, e.g., remind himself of his most recent changes, review another developer's recent changes, or identify a potential reason why a modification to a graph was not successful, or for other purposes.

In some examples, graphical representation of the differences between graphs can be integrated into a software management platform. A software management platform can be used, e.g., by a manager who oversees the development or maintenance of software, such as graphs. A manager can make use of graphical representation of differences between a previous version of a graph and an updated version of a graph to, e.g., observe software development progress, identify portions of a graph that are in need of additional development, assist in troubleshooting, or for other purposes.

In some examples, graphical representation of the differences between graphs can be integrated into an operational control center that facilitates the integrated management of various components of a processing environment. A control center can monitor and display the status of components of the processing environment, such as computing devices, applications, or jobs, and can allow an operator to actively manage the components of the processing environment. Description of an example control center can be found in U.S. application Ser. No. 14/690,114, the contents of which are incorporated here by reference in their entirety.

Figure 12:
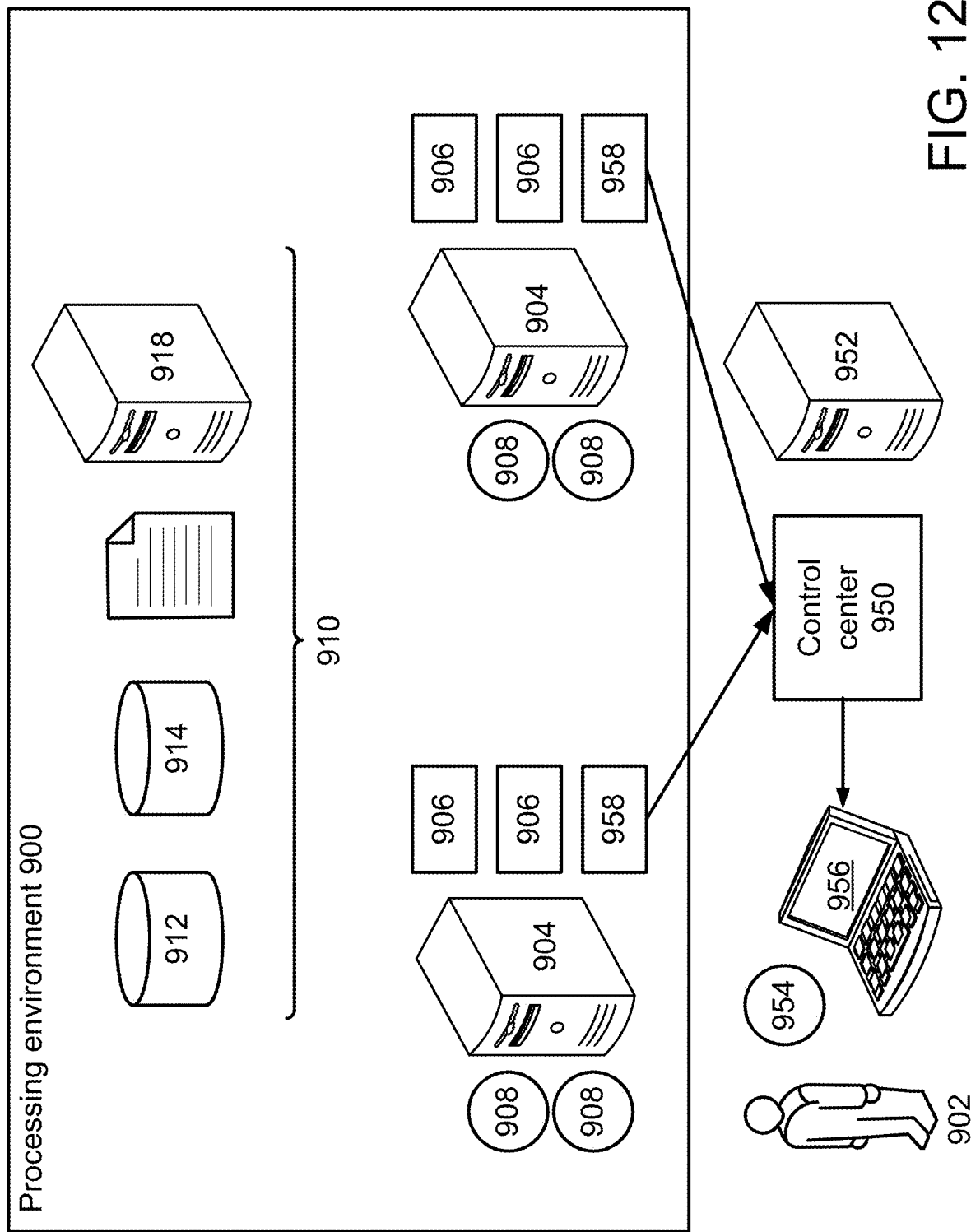
FIG. 12 is a diagram of a processing environment.

Referring to FIG. 12, a processing environment 900 includes hardware and software components that can be operated by or on behalf of a user 902 to process data. The hardware components can include hardware computing devices 904, such as servers, which we sometimes call "hosts." Each of the servers may include one or more data processors and one or more storages for storing instructions executed by the one or more data processors. The software components of the processing environment 900 can include applications 906, jobs 908, or services 910. The software components each executes on, or has an effect on, one or more of the hosts 904.

An application 906 is a computer program, such as a software product, that can be used to carry out various data processing functions, including, e.g., setting up a framework for data processing, executing a data processing framework, or analyzing processed data. An application can be a program that is targeted at performing or helping a user perform a task in a particular domain, such as word processing. One or more jobs 908 can be executed using one or more of the hosts 904, one or more of the applications 906, or both, of the processing environment 900. A job 908 is a set of one or more operations that are executed to process data. An example of a job is a graph or plan in a graph-based processing environment.

In some examples, an application 906 or a job 908 can utilize one or more services 910. A service 910 is a special case of an application, such as a long-running application, e.g., an application that is expected to be running as long as a host or server is running, that is targeted at a specific set of tasks (services) to be performed on behalf of an application or user., Example tasks that can be performed by a service 910 include, e.g., logging events or making events visible through a user interface. Example services 910 include, e.g., a database 912, a queue 914, a file 916, an application server 918, or another type of service.

An integrated control center 950 monitors the real time status of the hardware and software components of the processing environment 900. In some examples the control center 950 can execute on one of the hosts 904; in some examples, the control center 950 executes on a distinct computing device 952. For instance, the control center 950 can monitor the status of the hosts 904 and applications 906 to which the user 902 has access and the jobs 908 being executed on behalf of the user 902. Real time status information 954 about the components of the processing environment 900 can be displayed on a user interface 956. The status information 954 can be displayed in an integrated manner so as to highlight relationships among individual components of the processing environment 900, such as hosts 904, applications 906, jobs 908, services 910, or other components. The status information 954 can be displayed so as to display the status of one or more of the components or relationships among the status of individual components of the processing environment. Real time status information and historical status metrics and data processing metrics (e.g., metrics related to numbers of records processed, processing times, processing durations, or other metrics) can be available through the control center. Through the user interface 956, the user 902 can take actions related to one or more of the components of the processing environment or can define actions that are to be carried out automatically in response to a predefined occurrence related to one or more of the components of the processing environment.

Examples of real time status metrics that can be monitored and displayed for a host 904 include, for instance:

The operational status of the host—e.g., whether the host is online, online with an error or warning condition, or offline. In some cases, the control center 950 can monitor details related to the operational status of the host, such as whether the host is offline for scheduled maintenance or offline due to a fault (e.g., a disk failure).

The total central processing unit (CPU) usage of the host.
The total available memory or used memory of the host.
The number of file systems associated with the host.
The total available disk space or used disk space of the file system.
A number of jobs running on the host.
The identity of each of the jobs running on the host.
The CPU usage, memory usage, or both by each of the jobs running on the host.
A number of applications running on the host.
The identity of each of the applications running on the host.
The CPU usage, memory usage, or both by each of the applications running on the host.
The CPU usage, memory usage, or both for the particular user 902 relative to the maximum amount of CPU or memory licensed by the user.
The status (e.g., expiration date) of a license key stored on the host and the identity of the applications associated with that license key.
Parameters of the operating system
The number of CPUs
The CPU class
The CPU speed Other real time status metrics can also be monitored. In some examples, the user 902 can define custom status metrics to be monitored by the control center 950.

The control center 950 can also maintain information that allows for tracking of historical status metrics for a host 904. For instance, the control center 950 can maintain information that allows for tracking of the historical operational status of host, such as the percentage of time a host 904 has been offline over a given period of time, the number of error or warning conditions a host 904 has experienced over a given period of time, or other indicators of historical operational status. The control center 950 can maintain information that allows for the tracking of an average or total number of jobs 908 run on the host 904, an average or total number of applications 906 operating on the host 904, the average or maximum CPU load of the host 904, an average or minimum available memory of the host 904, or other indicators of historical status of the host 904. While some of this type of information may be found in one or more log files for a host 904, the integrated display provided by the control center 950 makes the information more readily accessible and more easily understood, thus allowing a person with less specific technical knowledge to access and analyze the historical status metrics for a host 904.

Examples of real time status metrics that can be monitored and displayed for a product or service include, for instance:

The status of the license key for the product or service—e.g., valid, valid but approaching expiration, or expired.
The identity of a key server on which the license key for the product or service is published.
The identity of the host on which the product or service is operating.
The number of jobs utilizing the product or service.
The identity of the jobs utilizing the product or service.
The location of a configuration file for the product or service.
The location of a log file for the product or service.
The identity of any services utilized by the product or service.
The status of each of the services utilized by the product or service (e.g., online, online with an error or warning condition, or offline).
The identity and status of any component related to the product or service.

Other real time status metrics can also be monitored. In some examples, the user 902 can define custom status metrics to be monitored by the control center 950.

Examples of real time status metrics that can be monitored and displayed for a job 908 include, for instance:

The real time operational status of the job—e.g., whether the job is running, stopped or paused, waiting to run, or completed.
The start time, elapsed time (if ongoing), or end time (if completed) of the job.
Whether the total elapsed time of the job met a target processing time (e.g., a service level agreement (SLA)) for the job.
The identity of the host on which the job is running.
The CPU usage by the job.
The identity of any products or services utilized by the job.
The type of data output by the job.
The location of the data output by the job.
The number of records processed during execution of the job.
The number of records rejected during execution of the job.
The status of each of the services utilized by the job.

Other real time status metrics can also be monitored. In some examples, the user 902 can define custom status metrics to be monitored by the control center 950.

The control center 950 can also maintain information that allows for tracking of historical status metrics for a job 908. For instance, the control center 950 can maintain information that allows for tracking of the average run time, the average CPU usage, the average number of records rejected, or other historical metrics for a given type of job.

Examples of actions that can be taken related to a job include, for instance:

Start or stop the job.
Schedule the job.
Rerun a job.
Disable a job so that it will not run.
Enable a disabled job so that it will run.
Put a job on hold.
Release a job from hold.
Investigate and resolve issues on a job.
Ignore a failed job so that jobs with dependencies on it will run anyway.
View and navigate to any predecessor or successor jobs.
View and navigate to any previous runs of the job.
View and navigate to a parent job, or to any child jobs.
View the queues being used by the job.
View the files being used by the job.
View the resources being used by the job.
View the products and services being used by the job.

The control center can also enable actions other than those listed above.

The control center can monitor queues 914 used by jobs. In some implementations, jobs depend on the data passed between data processing components, so knowing queue status gives a user insight into the overall performance of the jobs.

The control center can monitor resources used by jobs. The resources represent some aspect of the processing environment used by a plan. For example, a hardware component, measure, or programmatic object can be defined as a resource. CPU time, processor units, FTP (file transfer protocol) ports, disk capacity, file counts, input streams, and event triggers, and JVM (Java virtual machine) pools are examples of resources. The purpose of defining resources is to balance demand and capacity in the processing environment. Specifically, resources can be used to impose maximum limits and ordering to the loads placed on the system.

The user interface 956 displays some or all of the status information monitored by the control center 950 and allows the user to take actions related to one or more components of the processing environment 900. In general, status information is displayed and linked on the user interface 956 in a coherent, integrated manner that highlights relationships among the various components of the processing environment 900. Rather than displaying information about each individual component of the processing environment in a vacuum, this display paradigm makes visible or accessible insights into the overlap among the components of the processing environment. With this display paradigm, both the potential contributing factors to a performance issue with a particular component and the potential effects of a performance issue on other components can be understood and addressed.

For instance, with the integrated display of information provided on the user interface 956 of the control center 950, the user 902 can identify those jobs 908 that will be affected if a particular host 904 is taken offline for maintenance. Conversely, the user 902 may notice that certain jobs 908 are running more slowly than expected. Through the user interface 956, the user 902 may be able to determine that these jobs 908 are all running on the same host 904 and that that host 904 is CPU bound or I/O (input-output) bound. In both cases, the user 902 can take action to mitigate any potential performance issues or to resolve actual performance issues. For instance, through the user interface 956 and in response to a notification that a host 904 will be taken offline for scheduled maintenance, the user 902 can temporarily migrate the affected jobs 908 or the applications 906 utilized by those jobs 908 or both onto a different host 908. In the example of the CPU bound or I/O bound host 904, the user may alert a systems administrator to potential capacity problems with that host 904.

In some examples, when a job associated with a graph is executed, the operational control center records the version of the source code of the graph. If a job fails to complete successfully, the graph associated with that job was executed can be compared with another version of the graph (e.g., a graph associated with a previous, successfully completed job). Graphical representation of the differences between the two versions of the graph can help an operator to easily understand what has changed that may have caused the job to fail.

In some examples, a comparison between two versions of a graph can be performed responsive to user input, such as a request by the user to obtain more information about a failed job. For instance, a user can access comparison functionality through the user interface 956 or through an alert or communication indicative of the failed status of the job.

Figure 13:
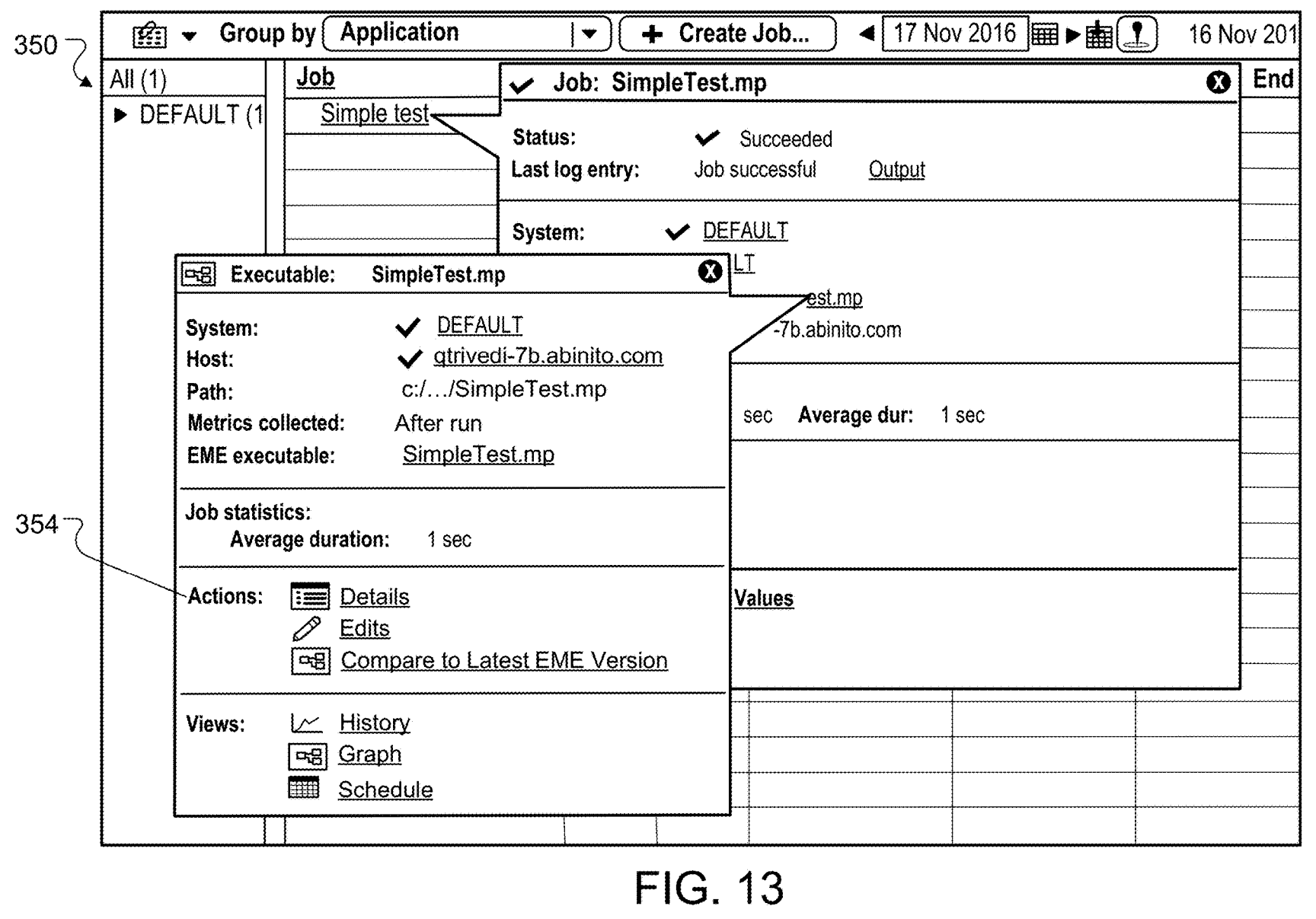

Referring to FIG. 13, in an example of an operational control center interface 350, a jobs window 352 provides access to details about a job, such as a completed job, a job that is currently running, or a job that is scheduled to run in the future. From the jobs window 352, a comparison action 354 enables the version of the graph based on which the job was executed to be compared to another version of the graph, such as a current version or a previous version. In the example of FIG. 12, the jobs window 352 provides details about the most recent job that successfully ran based on a particular graph, and the comparison action 354 compares that version of the graph to a current version of the graph. Such a comparison can be useful, e.g., to understand why jobs running based on the current version of the graph are no longer able to successfully complete. Such a comparison can also be useful, e.g., to determine whether the graph has been modified relative to the earlier version.

Figure 14:
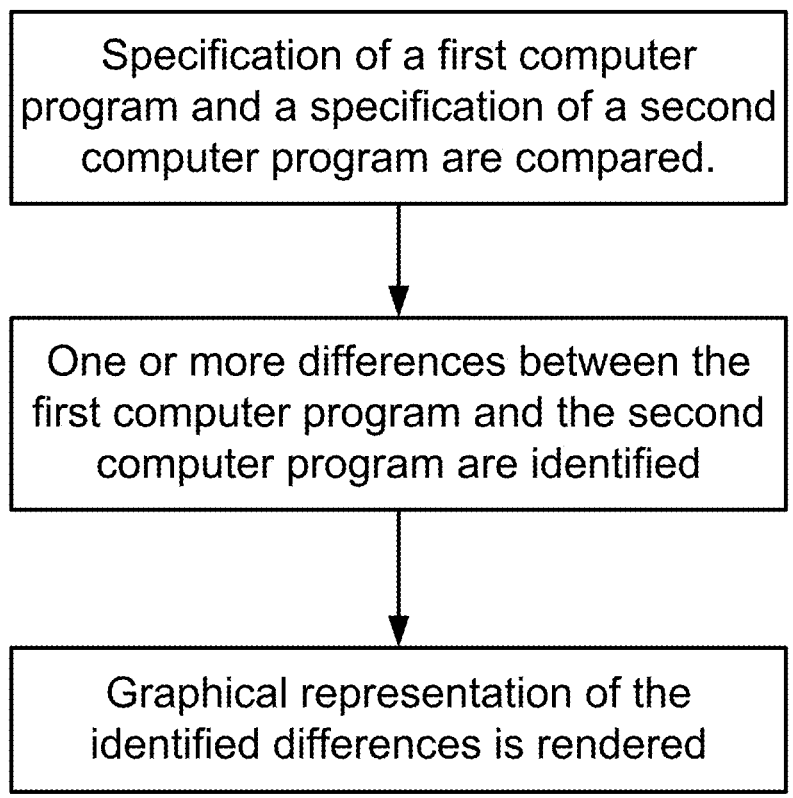
FIG. 14 is a flow chart.

Referring to FIG. 14, in an example approach to graphically representing differences, a specification of a first computer program (e.g., a first graph) and a specification of a second computer program (e.g., a second graph) are compared (300). Based on the comparing, one or more differences between the first computer program and the second computer program are identified (302). The one or more differences can include a node that is present in the first graph and not in the second graph. The one or more differences can include a first node in the first graph that corresponds to a second node in the second graph and that has a feature that differs from a corresponding feature of the second node, such as a parameter value or parameter expression. A graphical representation of the identified differences is rendered (304). The graphical representation is responsive to user interaction.

Figure 15:
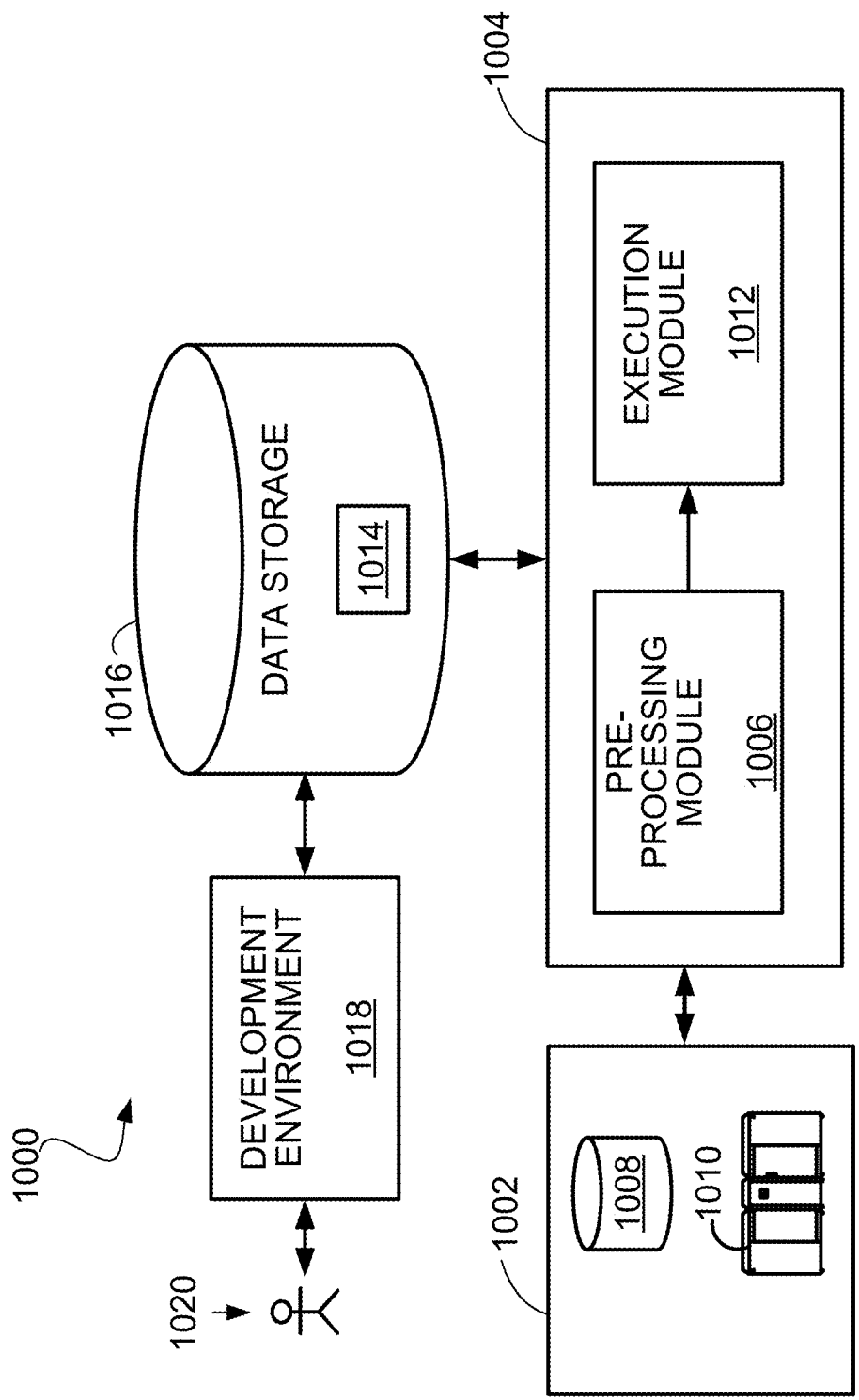
FIG. 15 is a diagram of a data processing system.

FIG. 15 shows an example of a data processing system 1000 in which the techniques for graphical representation of differences can be used. The system 1000 includes a data source 1002 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or machine data. An execution environment 1004 includes a pre-processing module 1006 and an execution module 1012. The execution environment 1004 may be hosted, for example, on one or more general-purpose computers under the control of a suitable operating system, such as a version of the UNIX operating system. For example, the execution environment 1004 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof Storage devices providing the data source 1002 may be local to the execution environment 1004, for example, being stored on a storage medium (e.g., hard drive 1008) connected to a computer hosting the execution environment 1004, or may be remote to the execution environment 1004, for example, being hosted on a remote system (e.g., mainframe computer 1010) in communication with a computer hosting the execution environment 1004, over a remote connection (e.g., provided by a cloud computing infrastructure).

The pre-processing module 1006 reads data from the data source 1002 and prepares data processing applications for execution. For instance, the pre-processing module 1006 can compile a data processing application, store and/or load a compiled data processing application to and/or from a data storage system 1016 accessible to the execution environment 1004, and perform other tasks to prepare a data processing application for execution.

The execution module 1012 executes the data processing application prepared by the pre-processing module 1006 to process a set of data and generate output data 1014 that results from the processing. The output data 1014 may be stored back in the data source 1002 or in a data storage system 1016 accessible to the execution environment 1004, or otherwise used. The data storage system 1016 is also accessible to a development environment 1018 in which a developer 1020 is able to design and edit the data processing applications to be executed by the execution module 1012. The development environment 1018 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," the contents of which are incorporated herein by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 1006 can receive data from a variety of types of systems that may embody the data source 1002, including different forms of database systems. The data may be organized as records having values for respective fields (also called "attributes" or "columns"), including possibly null values. When first reading data from a data source, the pre-processing module 1006 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

The approach to graphical representation of differences described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for displaying differences between a first executable dataflow graph and a second executable dataflow graph, each dataflow graph executable to process data records received by the dataflow graph, each dataflow graph including one or more nodes representing data processing components and one or more links representing flows of data records between components, the method including:

by a computer, comparing at least a portion of a specification of the first executable dataflow graph and at least a portion of a specification of the second executable dataflow graph to identify one or more differences between the at least a portion of the first dataflow graph and the at least a portion of the second dataflow graph, wherein the specification of a given executable dataflow graph defines one or more nodes each representing a data processing component configurable to define an operation to be performed to process data records, wherein the dataflow graph is configured to, when executed, (1) receive and process data records from a data source and (2) provide processed data records to a data sink;

the comparing of at least a portion of the specification of the first dataflow graph and the at least a portion of the specification of second dataflow graph including at least one of:

(1) identifying a particular node of the first dataflow graph that does not correspond to any node defined by the specification of the at least a portion of the second dataflow graph, the identified particular node representing a data processing component configurable to define an operation to be performed to process data records, (2) identifying a particular link of the first dataflow graph that does not correspond to any link defined by the specification of the at least a portion of the second dataflow graph, the identified particular link representing a flow of data records between components represented by nodes of the first dataflow graph, 3 identifying a first node of the first dataflow graph that corresponds to a second node defined by the specification of the at least a portion of the second dataflow graph, the identified first node representing a data processing component configurable to define an operation to be performed to process data records, and identifying a difference between the first node and the second node, (4) identifying a first link of the first dataflow graph that corresponds to a second link defined by the specification of the at least a portion of the second dataflow graph, the identified first link representing a flow of data records between components represented by nodes of the first dataflow graph, and identifying a difference between the first link and the second link; and displaying, in a graph editing interface, a graphical representation of at least some of the nodes or links of the first dataflow graph or the second dataflow graph, the graphical representation including a graphical indicator of at least one of (1) the identified particular node or link (1) the identified difference between the first node or link and the second node or link.

2. The method of claim 1, in which identifying a difference between the first node or link and the second node or link includes identifying a difference between a resolved parameter of the first node or link and a resolved parameter of the second node or link.

3. The method of claim 1, in which identifying a difference between the first node or link and the second node or link includes identifying a difference between an expression for a parameter of the first node or link and an expression for a parameter of the second node or link.

4. The method of claim 1, in which the graphical indicator is a shading, fill, or color of the first, second, or particular node or link in the graphical representation.

5. The method of claim 1, in which the graphical indicator includes a symbol positioned near the first, second, or particular node or link.

6. The method of claim 1, including enabling access to information indicative of the identified difference responsive to user interaction with the graphical indicator.

7. The method of claim 1, in which the first dataflow graph contains a first dataflow subgraph and in which the second dataflow graph contains a second dataflow subgraph, and including:
comparing a specification of the first dataflow subgraph and a specification of the second dataflow subgraph to identify one or more differences between the first dataflow subgraph and the second dataflow subgraph.

8. The method of claim 7, in which the graphical representation includes a hierarchical representation of at least one of the identified differences between the first dataflow graph and the second dataflow graph and at least one of the identified differences between the first dataflow subgraph and the second dataflow subgraph.

9. The method of claim 1, in which identifying a first node or link that corresponds to a second node or link includes identifying the first node based on one or more of (1) a name of the first node or link and second node or link and (2) an identifier of the first node or link and second node or link.

10. The method of claim 1, in which identifying a first node or link that corresponds to a second node or link includes identifying the first node based on information associated with a flow of data records into or out of the first node and second node.

11. The method of claim 1, in which identifying a first node or link that corresponds to a second node or link includes identifying the first node or link based on nodes or links that are upstream or downstream of the first node or link and second node or link.

12. The method of claim 1, including:
preparing the first dataflow graph and the second dataflow graph for execution; and
comparing the specifications of the prepared first and second dataflow graph.

13. A non-transitory computer readable medium storing instructions for causing a computer to display differences between a first executable dataflow graph and a second executable dataflow graph, each dataflow graph executable to process data records received by the dataflow graph, each dataflow graph including one or more nodes representing data processing components and one or more links representing flows of data records between components, the instructions causing the computer to:
compare at least a portion of a specification of the first executable dataflow graph and at least a portion of a specification of the second executable dataflow graph to identify one or more differences between the at least a portion of the first dataflow graph and the at least a portion of the second dataflow graph,
wherein the specification of a given executable dataflow graph defines one or more nodes each representing a data processing component configurable to define an operation to be performed to process data records, wherein the dataflow graph is configured to, when executed, (1) receive and process data records from a data source and (2) provide processed data records to a data sink;
the comparing of at least a portion of the specification of the first dataflow graph and the at least a portion of the specification of second dataflow graph including at least one of:
(1) identifying a particular node of the first dataflow graph that does not correspond to any node defined by the specification of the at least a portion of the second dataflow graph, the identified particular node representing a data processing component configurable to define an operation to be performed to process data records,
(2) identifying a particular link of the first dataflow graph that does not correspond to any link defined by the specification of the at least a portion of the second dataflow graph, the identified particular link representing a flow of data records between components represented by nodes of the first dataflow graph,
(3) identifying a first node of the first dataflow graph that corresponds to a second node defined by the specification of the at least a portion of the second dataflow graph, the identified first node representing a data processing component configurable to define an operation to be performed to process data records, and identifying a difference between the first node and the second node,
(4) identifying a first link of the first dataflow graph that corresponds to a second link defined by the specification of the at least a portion of the second dataflow graph, the identified first link representing a flow of data records between components represented by nodes of the first dataflow graph, and identifying a difference between the first link and the second link; and
display, in a graph editing interface, a graphical representation of at least some of the nodes or links of the first dataflow graph or the second dataflow graph, the graphical representation including a graphical indicator of at least one of (1) the identified particular node or link (1) the identified difference between the first node or link and the second node or link.

14. The non-transitory computer readable medium of claim 13, in which identifying a difference between the first node or link and the second node or link includes identifying a difference between a resolved parameter of the first node or link and a resolved parameter of the second node or link.

15. The non-transitory computer readable medium of claim 13, in which identifying a difference between the first node or link and the second node or link includes identifying a difference between an expression for a parameter of the first node or link and an expression for a parameter of the second node or link.

16. The non-transitory computer readable medium of claim 13, in which the graphical indicator is a shading, fill, or color of the first, second, or particular node or link in the graphical representation.

17. The non-transitory computer readable medium of claim 13, in which the graphical indicator includes a symbol positioned near the first, second, or particular node or link.

18. The non-transitory computer readable medium of claim 13, the instructions causing the computing system to enable access to information indicative of the identified difference responsive to user interaction with the graphical indicator.

19. The non-transitory computer readable medium of claim 13, in which the first dataflow graph contains a first dataflow subgraph and in which the second dataflow graph contains a second dataflow subgraph, and in which the instructions cause the computing system to:
compare a specification of the first dataflow subgraph and a specification of the second dataflow subgraph to identify one or more differences between the first dataflow subgraph and the second dataflow subgraph.

20. The non-transitory computer readable medium of claim 19, in which the graphical representation includes a hierarchical representation of at least one of the identified differences between the first dataflow graph and the second dataflow graph and at least one of the identified differences between the first dataflow subgraph and the second dataflow subgraph.

21. The non-transitory computer readable medium of claim 13, in which identifying a first node or link that corresponds to a second node or link includes identifying the first node based on one or more of (1) a name of the first node or link and second node or link and (2) an identifier of the first node or link and second node or link.

22. The non-transitory computer readable medium of claim 13, in which identifying a first node or link that corresponds to a second node or link includes identifying the first node based on information associated with a flow of data records into or out of the first node and second node.

23. The non-transitory computer readable medium of claim 13, in which identifying a first node or link that corresponds to a second node or link includes identifying the first node or link based on nodes or links that are upstream or downstream of the first node or link and second node or link.

24. The non-transitory computer readable medium of claim 13, the instructions causing the computing system to:
prepare the first dataflow graph and the second dataflow graph for execution; and
compare the specifications of the prepared first and second dataflow graph.

25. A system for displaying differences between a first executable dataflow graph and a second executable dataflow graph, each dataflow graph executable to process data records received by the dataflow graph, each dataflow graph including one or more nodes representing data processing components and one or more links representing flows of data records between components, the system including:
one or more processors and memory configured to:
compare at least a portion of a specification of the first executable dataflow graph and at least a portion of a specification of the second executable dataflow graph to identify one or more differences between the at least a portion of the first dataflow graph and the at least a portion of the second dataflow graph,
wherein the specification of a given executable dataflow graph defines one or more nodes each representing a data processing component configurable to define an operation to be performed to process data records, wherein the dataflow graph is configured to, when executed, (1) receive and process data records from a data source and (2) provide processed data records to a data sink;
the comparing of at least a portion of the specification of the first dataflow graph and the at least a portion of the specification of second dataflow graph including at least one of:
(1) identifying a particular node of the first dataflow graph that does not correspond to any node defined by the specification of the at least a portion of the second dataflow graph, the identified particular node representing a data processing component configurable to define an operation to be performed to process data records,
(2) identifying a particular link of the first dataflow graph that does not correspond to any link defined by the specification of the at least a portion of the second dataflow graph, the identified particular link representing a flow of data records between components represented by nodes of the first dataflow graph,
(3) identifying a first node of the first dataflow graph that corresponds to a second node defined by the specification of the at least a portion of the second dataflow graph, the identified first node representing a data processing component configurable to define an operation to be performed to process data records, and identifying a difference between the first node and the second node,
(4) identifying a first link of the first dataflow graph that corresponds to a second link defined by the specification of the at least a portion of the second dataflow graph, the identified first link representing a flow of data records between components represented by nodes of the first dataflow graph, and identifying a difference between the first link and the second link; and
display, in a graph editing interface, a graphical representation of at least some of the nodes or links of the first dataflow graph or the second dataflow graph, the graphical representation including a graphical indicator of at least one of (1) the identified particular node or link (1) the identified difference between the first node or link and the second node or link.

* * * * *

UNITED STATES PATENT AND TRADEMARK OFFICE
CERTIFICATE OF CORRECTION

PATENT NO. : 11,455,229 B2
APPLICATION NO. : 17/067020
DATED : September 27, 2022
INVENTOR(S) : Ilya Rozenberg and Adam Weiss It is certified that error appears in the above-identified patent and that said Letters Patent is hereby corrected as shown below:

On the Title Page

Column 1, Line 1, under "Inventors:", delete "PA" and insert -- MA --

In the Claims

Column 22, Line 37, Claim 1, delete "3" and insert -- (3) --

Signed and Sealed this
Fifteenth Day of November, 2022

Katherine Kelly Vidal
*Director of the United States Patent and Trademark Office*